United States Patent [19]

Krohn

[11] Patent Number: 5,673,856

[45] Date of Patent: Oct. 7, 1997

[54] LAWN MOWER CLEANING DEVICE AND METHOD OF MAKING SAME

[76] Inventor: Tim Krohn, R.R. 1 Box 79, Winthrop, Minn. 55396

[21] Appl. No.: 526,148

[22] Filed: Sep. 11, 1995

[51] Int. Cl.⁶ .................... B05B 1/20; B05B 13/02
[52] U.S. Cl. ............ 239/276; 239/279; 239/DIG. 6
[58] Field of Search ..................... 239/273, 276, 239/279, 281, DIG. 6

[56] References Cited

U.S. PATENT DOCUMENTS

| | | | |
|---|---|---|---|
| 414,346 | 11/1889 | Wainwright . | |
| 871,682 | 11/1907 | Fishburn . | |
| 949,520 | 2/1910 | Choate . | |
| 1,962,263 | 6/1934 | Tracy . | |
| 2,746,792 | 5/1956 | Hough . | |
| 2,903,190 | 9/1959 | Delt | 239/276 |
| 3,006,558 | 10/1961 | Jacobs | 239/267 |
| 3,040,990 | 6/1962 | Gotti | 239/273 |
| 3,108,608 | 10/1963 | Mahowald | 239/DIG. 6 X |
| 3,322,347 | 5/1967 | Pierce | 239/73 |
| 3,361,363 | 1/1968 | Babington | 239/267 |
| 3,856,028 | 12/1974 | Kehler | 134/198 |
| 4,762,278 | 8/1988 | Taylor | 239/281 |
| 4,784,327 | 11/1988 | Lund | 239/276 |
| 5,027,590 | 7/1991 | Stark | 56/12.1 |
| 5,152,459 | 10/1992 | Boeh | 239/DIG. 6 X |
| 5,312,047 | 5/1994 | Akers | 239/276 |

*Primary Examiner*—Lesley D. Morris
*Attorney, Agent, or Firm*—Jacobson & Johnson

[57] ABSTRACT

A method of making a cleaning device and a cleaning device for removing residue from the underside of a lawn mower including a lateral extension having a mower alignment guide with the extension sufficient high so an operator can operate the controls from the seat of a riding lawn mower, with the lawn mower cleaning device including reinforced members that carry an elongated wash arm having stakes thereon that can be driven into the ground to secure the wash arm in position for driving over with a riding lawn mower, with the wash arm having a minimum of sufficiently small openings so that the area of the openings is smaller in relation to the size of the plenum so the wash arm functions as a plenum chamber to thereby generate high pressure jets of water for cleaning the underside of the lawn mower.

10 Claims, 1 Drawing Sheet

LAWN MOWER CLEANING DEVICE AND METHOD OF MAKING SAME

FIELD OF THE INVENTION

This invention relates generally to lawn mower cleaning devices and, more specifically, to improved spray devices for cleaning the underside of a lawn mower housing to remove cut grass and the like, and to a method of making a lawn mower cleaning device from plastic pipe and plastic pipe fittings.

1. Background of the Invention

The art is replete with devices for cleaning the underside of the lawn mower housing. Basically, two types of cleaning devices are available, those that attach to the housing of the lawn mower with a garden house and spray water laterally into a plane parallel to the plane in which the blade rotates. The second type of lawn mower cleaning device has a ring-like housing that sprays water onto the outer peripheral portions of the underside of the lawn mower housing.

The present invention provides an improved lawn mower cleaning device that forces cleaning water radially outward to scour and clean the underside of the lawn mower more efficiently. The cleaning device can be assembled from plastic pipe and plastic pipe fittings available at local hardware stores. The only tools needed to make the cleaning device are a drill and saw for cutting the plastic pipe to length.

2. Brief Description of the Prior Art

U.S. Pat. No. 3,856,028 shows a mower cleaning apparatus that uses a circular housing for directing water upward to the underside of the mower housing to remove cut grass.

U.S. Pat. No. 5,312,047 shows a lawn mower washing ring that has jets that direct water upwardly and inwardly of the the underside of the mower housing to remove cut grass.

U.S. Pat. No. 5,027,590 shows a lawn mower attachment for connecting to the mower housing to introduce water to the underside of the mower housing to remove cut grass.

U.S. Pat. No. 1,962,263 shows a lawn sprinkler with the pipe located at about a 45 degree angle.

U.S. Pat. No. 949,520 shows a lawn sprinkler with a spike for holding the sprinkler in the ground.

U.S. Pat. No. 3,332,347 shows a dual-purpose mower washing device that can be used for cleaning the underside of the mower housing to remove cut grass or for watering a small spot.

U.S. Pat. No. 3,040,990 shows a washer attachment for clamping onto a rotary lawn mower for cleaning the underside of the mower housing to remove cut grass.

U.S. Pat. No. 414,346 shows a lawn irrigator with a spike to support the lawn irrigator in the ground.

U.S. Pat. No. 2,903,190 shows a sprinkler head with two pivotal spikes for holding a sprinkling head in the ground.

U.S. Pat. No. 2,746,792 shows a pattern spraying lawn sprinkler with a spike for holding the sprinkler in the soil.

U.S. Pat. No. 3,006,558 shows a lawn sprinkler nozzle that can be quickly shut off by pushing down on the spray head of the sprinkler. The sprinkler is held in the ground by a spike.

SUMMARY OF THE INVENTION

Briefly, the invention comprises an inexpensive lawn mower cleaning device and a method of making the same from plastic pipe and plastic pipe fittings using only a saw and drill. The lawn mower cleaning device lies entirely in one plane and can be quickly set up on the lawn to allow a person on a riding lawn mower to drive over the lawn mower cleaning device and when positioned over the cleaning device, allow the operator to turn the lawn mower cleaning device on or off without having to get off the lawn mower. The unit includes a wash arm having a plenum chamber of sufficient size in relationship to the openings for spraying jets of water so that high pressure water jets emanate from the lawn mower cleaning device. The number of openings in the wash arm can readily be increased or decreased to accommodate a larger or smaller sized lawn mower as long as the size and openings do not become sufficiently large so they decrease the force of the jets below a minimum level.

DESCRIPTION OF THE PREFERRED EMBODIMENT

Figure 1:
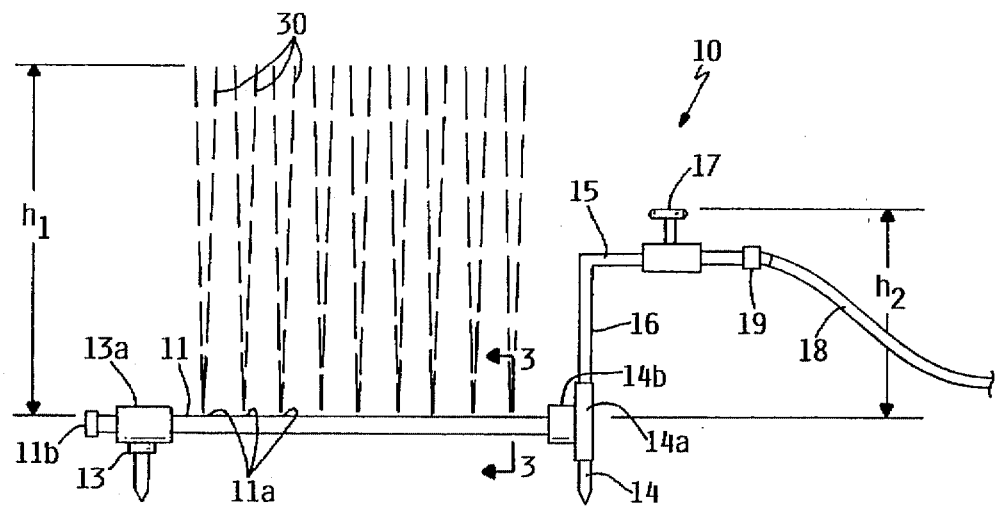
FIG. 1 shows a front view of my invention without a lawn mower located thereon.

FIG. 1 reference numeral 10 generally identifies my user-friendly underdeck lawn mower cleaning device for use with riding mowers. The cleaning device includes a wash arm 11 with a lateral extension 15 that forms a guide for positioning the lawn mower on the cleaning device, with the lateral extension extending upward sufficiently to enable a person on a riding mower to turn the water on or off from his or her seat on the riding mower.

Wash arm 11 generally comprises a generally straight hollow member such as a plastic PVC pipe. Located on one end of wash arm 11 is a cap 11b and located on the other end of wash arm 11 is a tee 14a. The pipe is positionable on a soil surface with pipe 11 having a top side with openings 11a for directing water vertically upward. The plurality of openings 11a therein are positioned with a central axis that is substantially vertical when the wash arm is located on the soil. PVC is preferred plastic pipe material for the wash arm because it is inexpensive and is readily worked with as well as retrofittable to accommodate more or fewer openings. That is, if more openings are required for a larger lawn mower, a user can, with a hand drill, increase the number of openings. On the other hand, if fewer openings are needed, the user can close the extra openings with PVC cement.

Fixedly secured proximate one end of wash arm 11 is a tee that has a rigid sleeve 13a extending around the exterior of wash arm 11. Tee 13a has a first stake 13 extending radially outward therefrom. Similarly, fixedly secured proximate the opposite end of wash arm 11 is a tee 14a having a second stake 14 extending therefrom. Stakes 13 and 14 preferably have a minimum length of approximately 4 to 5 inches and are operable for securing wash arm 11 on top of a soil surface in a condition that prevents both rotation or displacement of the wash arm if a lawn mower is driven over the wash arm. Stakes 13 and 14 are preferably plastic, such as PVC plastic, and can, if desired, be sharpened to facilitate ease in forcing the stakes into the soil. In order to set the cleaning device for cleaning, the user steps on the top portion of rigid sleeve 13a to drive stake 13 into the soil. Similarly, to drive stake 14 into the soil, the user steps on region 14b of tee 14a. Both the fittings, tee 14a and sleeve 13a, are sufficiently rigid so that a user can force the stakes into the ground by stepping on the top portion without fear of breaking the tees or breaking the wash arm 11.

The lateral extension 15 includes an upright mower alignment member 16 having a first end connected to wash arm 11 and a second end connected to a hand valve 17. The other side of hand valve 17 is connected to a garden hose 18 by a coupling 19. Garden hose 19 is normally connected to a household water supply. Valve 17, which can be a globe valve, is characterized by having an open condition to enable it to direct pressurized water into wash arm 11 and vertically upward through the plurality of openings 11a and onto the underside of a lawn mower deck located over the wash arm.

FIG. 1 shows that the water jets 30 sprays vertically upward a distance $h_1$ which is about a minimum of 10 feet when the wash arm is connected to a normal household water supply. The head of water is maintained by having a minimum of openings 11a which are sufficiently small so that wash arm 11 functions as a plenum chamber to maintain a strong upward force of water. The strong upward force of water aids in helping to dislodge material on the underside of the lawn mower.

Figure 3:
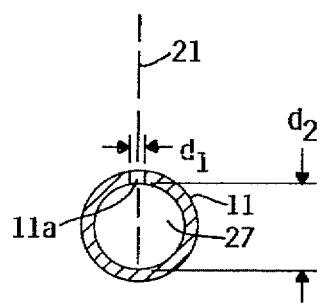
FIG. 3 shows a cross sectional view of the wash arm of my invention.

FIG. 3 shows a cross section of wash member 11 illustrating the comparative size of plenum chamber 28 (diameter $d_2$) and the size of opening 11a (diameter $d_1$) which are located along a vertical axis 21. The diameter of the openings $d_1$ is determined by the water pressure and the number of holes placed in the wash arm 11 and can be readily determined by observing the height of the water jets emanating from the wash arm 11. For example, FIG. 1 shows that the jets spray water a distance $h_1$ upward in excess of 10 feet. By placing more openings in the wash arm, the height of the jets will gradually decrease and consequently the force of the water available for cleaning the underside of the mower. If the user has sufficient water supply, he or she can make additional openings in the wash arm while still maintaining the jets at sufficient force. On the other hand, if the household water supply is low the user would have less openings in the wash arm so that one is assured that the force of the jets can be maintained. Thus, the present invention is suitable for use in different water supply systems such as those that have their own pump as well as for water supply systems from municipal sources.

One of the features of my invention is that the invention is adaptable for different sized lawn mowers. That is, if a user has a riding lawn mower with a larger deck, the user can place additional openings in wash arm 11 by using a hand drill and bit. Consequently, the user can customize the cleaning device for his or her own lawn mower. Similarly, if the user needs to reduce the number of openings, he or she can do so by closing the openings with a solvent cement or the like.

Another feature of the present invention is that the invention can be entirely built out of readily available material with the use of only hand tools of a saw and drill. The saw can be used to cut the plastic pipe and stakes to proper length and the drill can be used to form the openings in the wash arm. The entire unit can be assembled using plastic pipe cement. Of the available plastic pipe and fittings the PVC is preferred because it has sufficient rigidity and strength to be driven over with a riding lawn mower without damaging the pipe 10.

Briefly, the method of making a lawn mower cleaning device from plastic pipe includes the steps of cutting a section of plastic pipe to a length which is greater than the length of a lawn mower deck requiring cleaning to form a wash arm 11. A cap 11b is placed on one end of the wash arm and tee 13 having a stake 13a is secured to one end of the wash arm 11. Preferably, the opening in tee 13a is sufficiently large so that it fits over the outside of wash arm 11 and can be fixedly secured thereto with an adhesive. Next, one secures a second tee having a stake to the opposite end of the wash arm. One then secures an alignment member comprising a plastic pipe to the second tee, with the alignment member extending vertically upward and in the same plane as stakes 13 and 14 and wash arm 11. One then secures a water valve 17 to the alignment member 16, with the water valve secured at sufficient height ($h_2$) so that a person on a riding lawn mower can open or close the valve without having to get off the riding lawn mower. To use the lawn mower cleaning device, one connects the valve to a household water supply. The user can then drill holes in the wash arm to produce water jets. By observing the height of the water jets as the holes are being drilled into the wash arm the person determines the number of holes to drill while still maintaining the necessary force on each water jet.

Figure 2:
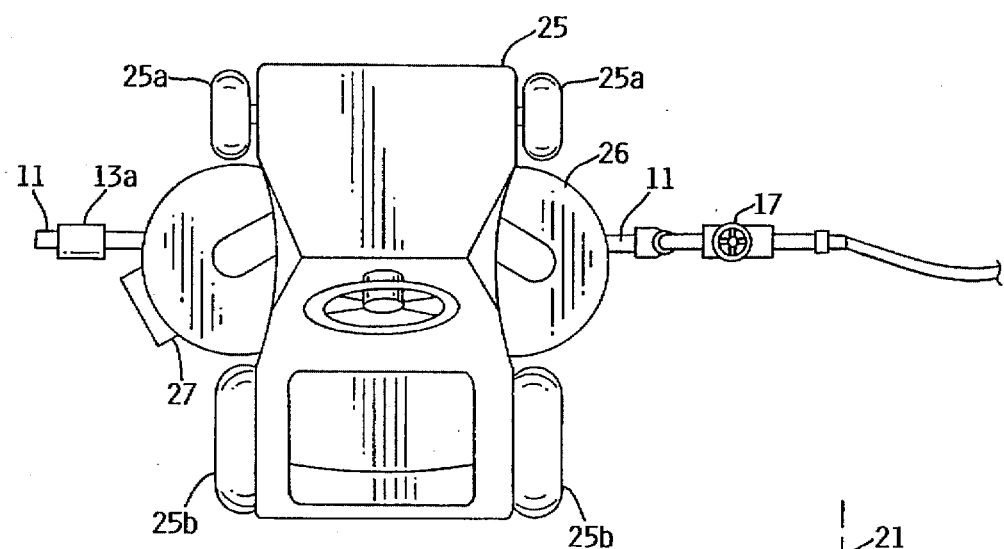
FIG. 2 shows a top view with a riding lawn mower located over the wash arm of my invention.

FIG. 2 illustrates my invention with a riding mower 25 positioned over wash arm 11. In this condition, wash arm 11 sprays water directly upward into the underside of the elongated lawn mower housing 26. Located on the left side of housing 26 is a grass discharge chute 27. With the lawn mower operating, the water is directed upward and sprayed out chute 27 as shown in FIG. 2. The result is that the combined action of the spray and the rotating action of the blades in housing 26 thoroughly cleans the underside of the lawn mower.

To clean the underside of the lawn mower, the user drives front wheels 25a over the wash arm and centers the mower housing along wash arm 11. Next, the operator, while sitting on the lawn mower, reaches over and opens valve 17, which sprays water on the underside of the lawn mower housing. The operator can then turn on the lawn mower and let the combination of the upward spraying water jets and the rotating blades remove any residue with a dishwasher type action.

After cleaning the underside of the lawn mower, the operator reaches for hand valve 17 from the seat of the lawn mower and turns off the water supply. FIG. 1 shows that the hand valve 17 is at a height $h_1$ sufficiently far from the ground so that the operator can reach the valve without having to get off the riding lawn mower. In most instances, a height of approximately 18 inches is sufficient to enable a person to open and close the valve without having to get off the riding mower.

I claim:

1. A user-friendly underdeck lawn mower cleaning device for a lawn mower comprising:

a generally elongated hollow member having a plenum chamber therein, said hollow member adaptable for positioning on a soil surface, said hollow member having a top side and a bottom side, said top side having a plurality of openings therein, said plurality of openings having a central axis that is substantially vertical when said bottom side is located on said soil surface, said plurality of openings of sufficient size and number adjustable to ensure that a plurality of water cleaning jets emerge from said hollow member, said hollow member having a first closed end, and a second end, said second end having an opening therein, said hollow member free of any base plate to enable said elongated hollow member to be placed directly on the ground to thereby enable one to drive a lawnmower over the hollow member without the use of a ramp cover;

a lateral extension having an upright member, said upright member having a first end connected to said second end and extending upward from said top surface of said hollow member to form a mower guide;

a valve connected to said lateral extension, said valve having an open condition to enable pressurized water to be directed into the hollow member and vertically upward through the plurality of openings and onto the underside of a lawn mower deck located over said top surface;

a first stake located proximate said first end, said first stake fixedly secured to said first end to prevent rotation of said first end with respect to said first stake; and a second stake located proximate said second end, said second stake fixedly secured to said second end to prevent rotation of said second end with respect to said second stake, said first stake and said second stake operable for securing said hollow member to the soil surface in a condition that prevents rotation or displacement of said hollow member if a lawn mower is driven over said hollow member to enable a person to clean the underside of a lawn mower while the mower is running.

2. The cleaning device of claim 1 wherein the wash arm comprises a PVC pipe.

3. The cleaning device of claim 1 wherein the lateral extension includes a connector for attachment to a garden hose.

4. The cleaning device of claim 3 wherein the wash arm is a straight section of PVC pipe.

5. The cleaning device of claim 3 wherein the lateral extension extends vertically upward sufficiently so that a person sitting on a riding lawn mower can open or close a water supply to the cleaning device without having to dismount from the lawn mower.

6. The cleaning device of claim 3 wherein the plurality of openings are located along a vertical axis to direct water vertically upward.

7. The cleaning device of claim 6 wherein the lateral extension is made of rigid plastic.

8. The cleaning device of claim 7 wherein the wash arm, the upright member, and the stakes are located in a common plane.

9. The cleaning device of claim 8 wherein wash arm includes a first tee secured thereto for carrying said first stake and a second tee secured thereto for carrying a second stake.

10. The method of making a lawn mower cleaning device from plastic pipe comprising:

cutting a section of plastic pipe to a length which is greater than the length of a lawn mower deck to be cleaned to form a wash arm;

securing a first tee having a stake to one end of the wash arm with a plastic pipe cement to enable said wash arm to be positioned along a soil surface and to prevent said wash arm from rotation with respect to said first tee;

securing a second tee having a stake to the opposite end of the wash arm with additional plastic pipe cement to further prevent said wash arm from rotation with respect to the second tee;

securing an alignment member to the second tee with the alignment member;

securing a water valve to the alignment member with the water secured at sufficient height so that a person on a riding lawn mower can open or close the valve without having to get off the riding lawn mower;

drilling plurality holes in a spaced condition along said section of pipe;

directing water through the plastic pipe to observe the height of a water jet emerging from said plastic pipe; and drilling additional holes in said plastic pipe until the water jets emerging from said plastic pipe are sufficient height and sufficient spacing to ensure that a lawn mower blade located thereover can be cleaned of debris by said water jets and rotation of a lawn mower blade located under said lawn mower deck.

* * * * *